United States Patent [19]

Redlich

[11] Patent Number: 4,525,827
[45] Date of Patent: Jun. 25, 1985

[54] APPARATUS FOR REMOVING A CUT CHIP BY SUCTION

[75] Inventor: Horst Redlich, Berlin, Fed. Rep. of Germany

[73] Assignee: TELDEC Telefunken - Decca Schallplatten GmbH, Hamburg, Fed. Rep. of Germany

[21] Appl. No.: 423,047

[22] Filed: Sep. 24, 1982

[30] Foreign Application Priority Data

Oct. 24, 1981 [DE] Fed. Rep. of Germany ....... 3142206

[51] Int. Cl.³ ............................................. G11B 3/58
[52] U.S. Cl. ..................... 369/72; 369/127; 369/132; 369/155
[58] Field of Search ................. 369/72, 155, 166, 231, 369/153, 154, 127, 130, 132

[56] References Cited

U.S. PATENT DOCUMENTS 2,059,263 11/1936 Miller .
2,963,556 12/1960 Redlich .
3,835,262 9/1974 Moritz et al. .

FOREIGN PATENT DOCUMENTS 1522989 10/1969 Fed. Rep. of Germany .
2915003 10/1980 Fed. Rep. of Germany ........ 369/72
2181041 11/1973 France .
 388023  2/1933 United Kingdom .
1101512  1/1968 United Kingdom ................ 369/154

*Primary Examiner*—Steven L. Stephan
*Attorney, Agent, or Firm*—Spencer & Frank

[57] ABSTRACT

A device for removing a chip produced during cutting of information into a record carrier, particularly a metallic record carrier, wherein the cut chip is removed by means of suction air and the magnitude or pressure of this suction air is controlled in dependence on the depth recording component of the recording.

10 Claims, 3 Drawing Figures

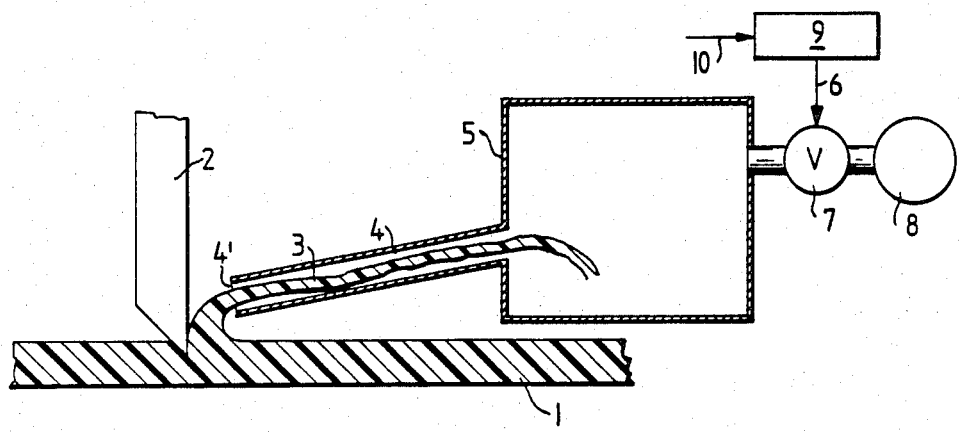
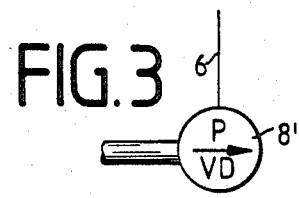
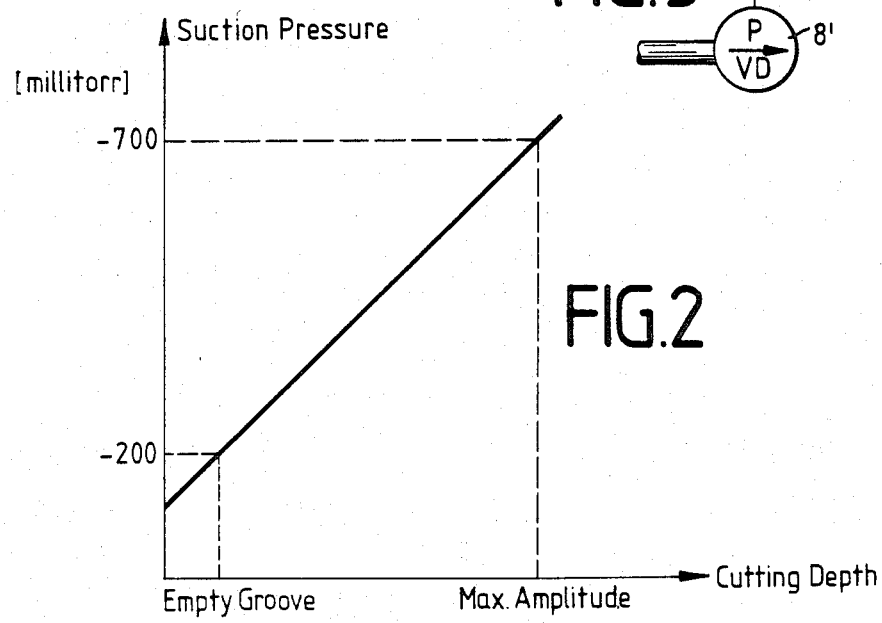

APPARATUS FOR REMOVING A CUT CHIP BY SUCTION

BACKGROUND OF THE INVENTION

The present invention relates to an apparatus for removing, by means of suction, a chip formed during cutting of information into a record carrier, particularly a metallic record carrier.

When cutting signals into a planar, disc-shaped record carrier, the chip produced by the cutting process is generally suctioned away by means of air. When records are cut in wax plates or lacquer foils, which are usually applied to an aluminum substrate, the chip can be removed relatively easily and without interference to the procedure since the chip is sufficiently elastic.

In contrast to cutting in lacquer foils, it is not possible to properly remove the chip with the usual suction pressure when information is cut into metallic substrates, preferably copper substrates. That is, since a copper chip is much harder and firmer than a lacquer foil chip, the suction pressure required for removing the chip from metallic record carriers must be selected to be very much higher.

A high suction pressure, however, produces a noise at the point of entrance into the suction tube used for the removal and, because of the proximity of that location to the cutting stylus, this noise may be superposed over the modulation to be recorded. Therefore, the modulation may include interference from the noise of the suction air.

SUMMARY OF THE INVENTION

It is therefore the object of the present invention to provide a device which prevents annoying superposition of the suction noise on the modulation to be recorded.

The above object is accomplished according to the present invention in that in an apparatus for removing a cut chip produced during cutting of information into a record carrier by a cutting stylus, first means are provided for producing suction air in the immediate vicinity of the cutting stylus and for removing the cut chip by means of the suction air, and second means are provided for controlling the pressure of the suction air in dependence on the depth recording component of the recording. The invention is particularly applicable when the record carrier is made of metal. Preferably, the control parameter for controlling the pressure of the suction air is derived from the control parameter for controlling the rate of advance of the cutting stylus.

According to further features of the invention, the magnitude of the suction pressure which is to be controlled can vary from −100 to −800 millitorr, the control parameter for controlling the suction pressure is brought to a controllable value which controls the suction pressure of a suction pump which operates with a constant suction pressure or to a controllable suction pump, and the magnitude of the suction pressure is controlled in stages, with the highest suction pressure being applied when a deep cut is taken. Finally, according to further features of the invention, a container for receiving the removed cut chips is disposed as closely as possible to the cutting stylus, and a suction tube, which extends from adjacent the stylus to the container and which is in communication with the container, has a length which does not exceed 100 mm.

With the aid of the invention, any annoying superposition of the suction noise on the modulation is avoided. If the modulation contains low-volume passages, the suction pressure is controlled in such a manner that it is less than that used for loud modulation passages. Due to the dependence of the suction pressure on the depth recording component, there results a dynamic dependent control of the suction air.

BRIEF DESCRIPTION OF THE DRAWINGS

FIG. 1 is a schematic illustration of an arrangement of the cutting stylus and suction air tube and suction apparatus of the apparatus according to the invention.

FIG. 2 is a graph showing the dependence of the suction pressure on the cutting depth.

FIG. 3 is a detail view of a modified portion of the arrangement of FIG. 1.

DETAILED DESCRIPTION OF THE PREFERRED EMBODIMENTS

Referring now to FIG. 1, there is shown a record carrier 1 into which a modulated groove is being cut by means of a cutting stylus 2. The resulting chip 3 of material cut from the carrier 1 is removed by suction air into a tube 4 disposed directly adjacent the cutting stylus 2 and deposited in a container 5. The suction pressure produces a noise at the entrance opening 4' of the tube 4, and due to the immediate proximity of the cutting stylus 2 to the tube 4, and particularly the opening 4', this noise is transferred to the cutting stylus 2 and thus influences the modulation. In the known recording devices, i.e. without the device according to the invention, this noise would lie in an order of magnitude of three to four dB above the basic noise of the record carrier.

In a conventional sound recording according to the variable groove method, the rate of advance and the average cutting depth are controlled in dependence on the coming modulation. Control is effected by picking up the modulation with an additional head in the magnetic tape recorder from which the recording is usually transferred to the cutting stylus. The additional head is disposed, with respect to time, about one half to one revolution of the record carrier in front of the head which picks up the modulation for the cutting stylus so that if there is a change in amplitude in the recording, the rate of advance and the average cutting depth are adapted to the coming amplitude. Such a method is for example known from U.S. Pat. No. 2,963,556. This specification discloses a conventional system providing a control parameter signal for the cutting depth and can be used with the device according to the invention.

In the device according to the invention, the control parameter for the control of the average cutting depth or the rate of advance of the stylus 2 is additionally used to control the magnitude of the suction air or pressure applied to the chip 3. With a deep cutting depth, the chip 3 produced by the stylus 2 is thick and thus requires more suction than a thin chip 3 resulting from a shallower cutting depth. Thus, for a loud signal, and thus a deep cutting depth, the suction pressure is increased, whereas for a soft or low signal the suction pressure is reduced. In this way the louder noise produced with a high suction pressure can have an effect only on loud portions of the recording, where it will not be audible due to the masking effect. The magnitude of the suction pressure which can be applied to the chip 3 should be variable from about −100 to about −800 millitorr.

FIG. 2 shows the dependence of the suction pressure on the cutting depth. In FIG. 2 the suction pressure is plotted on the vertical axis, and the cutting depth is plotted on the horizontal axis. As can be seen from FIG. 2, according to the invention, during soft passages and during periods when the grooves are empty, in which case the cutting depth is very shallow, the suction pressure is about −200 millitorr. For a loud passage to be recorded, i.e. with a great cutting depth, the suction pressure is about −700 millitorr.

As shown in FIG. 1, in order to control the suction pressure applied to the chip 3, a signal constituting a control parameter representative of the depth recording component or rate of advance of stylus 2 is applied via a conductor 10 to a suitable control circuit 9 which delivers, via an output conductor 6, a signal constituting a corresponding control parameter to a controllable valve 7, which in turn controls the suction pressure of a pump 8 operating with a constant suction pressure. It is also possible, as shown in FIG 3, to employ a controllable pump 8′ to which the output conductor 6 is directly connected. Preferably the valve 7 (or controllable pump) is controlled by circuit 9 such that the pressure of the suction air is regulated in stages, e.g. three stages, with the highest suction pressure being utilized for a large depth recording component and the lowest suction pressure being used for an empty groove.

The container 5 for deposit of the cutting chip 3 is advantageously disposed as closely as possible to the cutting stylus 2 since a metallic chip can be transported through the suction tube 4 only over a short distance before it produces interference in the chip formation by a change in the chip thickness at deep depth recording modulations. Accordingly, the length of the suction tube 4 should not exceed 100 mm.

The control of the suction pressure provides the additional advantage that the radius of the chip at the point of cutting depends on the thickness of the cut chip. In this way it is assured that the chip will not be bent which would be transferred to the modulation and cause interference.

It will be understood that the above description of the present invention is susceptible to various modifications, changes and adaptions, and the same are intended to be comprehended within the meaning and range of equivalents of the appended claims.

What is claimed is:

1. Apparatus for removing a cut chip produced during cutting of information into a metal record carrier by a cutting stylus comprising, in combination: first means for producing suction air in the immediate vicinity of the cutting stylus and for removing the cut chip by means of the suction air; and second means for controlling the pressure of the suction air in dependence on the depth recording component of the recording.

2. Apparatus as defined in claim 1 wherein the rate of advance of the cutting stylus is controlled by a first control parameter related to the depth recording component and said second means includes means for deriving a second control parameter for controlling the pressure of the suction air from the first control parameter.

3. Apparatus as defined in claim 1 wherein the magnitude of the suction pressure is controlled from −100 to −800 millitorr.

4. Apparatus as defined in claim 1 wherein: said first means comprises a suction pump which operates with a constant suction pressure, and said second means comprises a controllable valve which is connected to said pump and which controls the suction pressure of said pump, and control means connected to control said valve.

5. Apparatus as defined in claim 1 wherein said first means includes a controllable suction pump, and said second means comprises control means connected to control the suction pressure produced by said pump.

6. Apparatus as defined in claim 1 wherein said first means includes a suction tube positioned adjacent the stylus, and a container, which is in communication with said tube, for receiving the removed cut chips, said container being disposed as closely as possible to the cutting stylus.

7. Apparatus as defined in claim 6 wherein the length of said suction tube does not exceed 100 mm.

8. Apparatus as defined in claim 1 wherein said second means regulates the pressure of the suciton air in stages in accordance with the depth recording component.

9. Apparatus as defined in claim 8 wherein said second means regulates the pressure of the suction air so that the highest suction pressure is produced adjacent the stylus when the depth recording component is large, and the lowest suction pressure is produced adjacent the stylus for an empty groove in the recording.

10. Apparatus as defined in claim 9 wherein said second means regulates the pressure of the suction air in three stages.

* * * * *